US012139407B2

United States Patent
Fujimoto et al.

(10) Patent No.: US 12,139,407 B2
(45) Date of Patent: Nov. 12, 2024

(54) METHOD FOR PRODUCING CARBON NANOTUBE TWISTED THREAD, AND PRODUCTION APPARATUS OF CARBON NANOTUBE TWISTED THREAD

(71) Applicants: HITACHI ZOSEN CORPORATION, Osaka (JP); TOKUSEN KOGYO CO., LTD., Hyogo (JP)

(72) Inventors: Norifumi Fujimoto, Osaka (JP); Hiroyuki Ohue, Hyogo (JP); Eiji Ohta, Hyogo (JP); Tomohiro Yamakawa, Hyogo (JP)

(73) Assignees: HITACHI ZOSEN CORPORATION, Osaka (JP); TOKUSEN KOGYO CO., LTD., Hyogo (JP)

( * ) Notice: Subject to any disclaimer, the term of this patent is extended or adjusted under 35 U.S.C. 154(b) by 303 days.

(21) Appl. No.: 17/761,094

(22) PCT Filed: Sep. 4, 2020

(86) PCT No.: PCT/JP2020/033663
§ 371 (c)(1),
(2) Date: Mar. 16, 2022

(87) PCT Pub. No.: WO2021/054154
PCT Pub. Date: Mar. 25, 2021

(65) Prior Publication Data
US 2022/0348464 A1 Nov. 3, 2022

(30) Foreign Application Priority Data
Sep. 18, 2019 (JP) .................................. 2019-169389

(51) Int. Cl.
*C01B 32/16* (2017.01)
*D02G 3/26* (2006.01)

(52) U.S. Cl.
CPC ............... *C01B 32/16* (2017.08); *D02G 3/26* (2013.01)

(58) Field of Classification Search
CPC ........ C01B 32/16; C01B 32/168; D02G 3/26; D02G 3/16; D02G 3/441; D10B 2101/122; H01B 1/04; H01B 5/08; H01B 13/00
See application file for complete search history.

(56) References Cited

U.S. PATENT DOCUMENTS

| 4,624,102 A | 11/1986 | Bell, Jr. |
| 2010/0236211 A1 | 9/2010 | Morioka |

(Continued)

FOREIGN PATENT DOCUMENTS

| CN | 101838873 A | 9/2010 |
| CN | 101967699 A | 2/2011 |

(Continued)

OTHER PUBLICATIONS

Machine Translation of JP 2011-208296 to Osaka Prefecture, et al. (Year: 2011).*

(Continued)

*Primary Examiner* — Daniel C. McCracken
(74) *Attorney, Agent, or Firm* — Pillsbury Winthrop Shaw Pittman, LLP (57) ABSTRACT

A plurality of CNTs are drawn out of VACNTs so as to be continuous in lines and are bundled into a thread shape, and a temporary thread bundled into a thread shape is temporarily wound on the first winder. The first winder is then rotated about an axis along a feeding direction of the temporary thread to twist the temporary thread while the temporary thread is fed from the first winder.

10 Claims, 6 Drawing Sheets

(56) References Cited

U.S. PATENT DOCUMENTS

| | | |
|---|---|---|
| 2012/0144984 A1 | 6/2012 | Head, III et al. |
| 2012/0267141 A1 | 10/2012 | Kamiyama et al. |
| 2014/0217643 A1 | 8/2014 | Nikawa et al. |
| 2016/0153124 A1 | 6/2016 | Yano et al. |
| 2018/0113152 A1 | 4/2018 | Suzuki et al. |
| 2018/0170757 A1 | 6/2018 | Watanabe et al. |
| 2018/0179064 A1 | 6/2018 | Inoue et al. |
| 2018/0247724 A1 | 8/2018 | Richmond et al. |
| 2019/0010376 A1 | 1/2019 | Inoue et al. |
| 2019/0039904 A1 | 2/2019 | Fujimoto et al. |
| 2019/0382270 A1 | 12/2019 | Fujimoto et al. |
| 2021/0002794 A1 | 1/2021 | Inoue |

FOREIGN PATENT DOCUMENTS

| | | | | |
|---|---|---|---|---|
| CN | 102714073 A | 10/2012 | | |
| CN | 103603100 A | 2/2014 | | |
| CN | 104294434 A | 1/2015 | | |
| CN | 105350130 A | 2/2016 | | |
| CN | 107851476 A | 3/2018 | | |
| CN | 108430919 A | 8/2018 | | |
| CN | 108511105 A | 9/2018 | | |
| CN | 108625005 A | 10/2018 | | |
| CN | 108699734 A | 10/2018 | | |
| CN | 110177761 A | 8/2019 | | |
| EP | 3018241 A1 | 5/2016 | | |
| JP | 2008-523254 A | 7/2008 | | |
| JP | 2009-509066 A | 3/2009 | | |
| JP | 2011-208296 | * 10/2011 | ............... | D02G 3/16 |
| JP | 2011-208296 A | 10/2011 | | |
| JP | 2014-169521 A | 9/2014 | | |
| JP | 2016-190982 | * 11/2016 | ............ | C08L 101/00 |
| JP | 2016-190982 A | 11/2016 | | |
| JP | 2017-007919 A | 1/2017 | | |
| WO | 2007/015710 A2 | 2/2007 | | |
| WO | 2008/036068 A2 | 3/2008 | | |
| WO | 2015/011767 A1 | 1/2015 | | |
| WO | 2015/011768 A1 | 1/2015 | | |
| WO | 2017/131061 A1 | 8/2017 | | |

OTHER PUBLICATIONS

Machine Translation of JP 2016-190982 to Hitachi Shipbuilding (Year: 2016).*

Extended European Search Report dated Sep. 19, 2023, issued in corresponding European Patent Application No. 20866138.9 (40 pgs.).

International Search Report dated Nov. 17, 2020 issued in corresponding International Application No. PCT/JP2020/033663 with English translation (7 pgs.).

* cited by examiner

METHOD FOR PRODUCING CARBON NANOTUBE TWISTED THREAD, AND PRODUCTION APPARATUS OF CARBON NANOTUBE TWISTED THREAD

CROSS-REFERENCE TO RELATED APPLICATIONS

This application claims priority to International Patent Application No. PCT/JP2020/033663, filed Sep. 4, 2020, which claims priority to Japanese Patent Application No. 2019-169389, filed Sep. 18, 2019, the entire contents of each of which are incorporated herein by reference.

TECHNICAL FIELD

The present invention relates to a method for producing a carbon nanotube twisted thread, and a production apparatus of a carbon nanotube twisted thread.

BACKGROUND ART

Carbon nanotubes have been known to have excellent mechanical strength, thermal conductivity and electrical conductivity, and it has been considered that a plurality of carbon nanotubes are formed into a thread shape to be used as a carbon nanotube thread in various industrial products.

As a method for producing such a carbon nanotube thread, for example, a method for producing a carbon nanotube twisted thread has been proposed in which after drawing a carbon nanotube web composed of continuously connected carbon nanotubes out of a carbon nanotube array which is grown on a substrate, a carbon nanotube twisted thread obtained by twisting the carbon nanotube web is wound around a thread winding spindle while the carbon nanotube web is twisted (ref: for example, Patent Document 1).

Such a method for producing a carbon nanotube twisted thread is carried out with a spinning apparatus including a substrate on which a carbon nanotube array is disposed, and a rotating portion which supports a thread winding spindle rotatably. In the spinning apparatus, by inputting a driving force into the rotating portion and the thread winding spindle, the thread winding spindle rotates about an axis of the thread winding spindle while the rotating portion rotates about a rotation axis intersecting with the axis of the thread winding spindle.

Thus, the thread winding spindle continuously draws the carbon nanotube web out of the carbon nanotube array, and winds the carbon nanotube twisted thread while the carbon nanotube web is twisted along with the rotation of the rotating portion.

SUMMARY OF THE INVENTION

Problem to be Solved by the Invention

However, in the method for producing a carbon nanotube twisted thread described in Patent Document 1, in order to rotate the thread winding spindle about the axis of the thread winding spindle, it is necessary to input a driving force from a driving source such as a motor provided in the rotating portion into the thread winding spindle, and to supply an electric power to the driving source via the rotating portion.

Therefore, it is considered that a connector for rotary connection such as a slip ring for electrically connecting the rotating portion which is rotating to an external power source is provided to supply the electric power to the driving source in the rotating portion.

However, with the connector for rotary connection such as a slip ring, there is a limit to improvement in a rotation rate of the rotating portion while ensuring electrical connection between the rotating portion and the external power supply. Further, providing the connector for rotary connection makes a configuration of a production apparatus of a carbon nanotube twisted thread complicated.

Therefore, it is considered that the carbon nanotube web is twisted by rotating the substrate on which the carbon nanotube array is disposed, without rotating the rotating portion. However, when the carbon nanotube twisted thread is industrially produced, it is difficult to stably rotate the substrate, and the rotation rate of the substrate cannot be sufficiently ensured due to enlargement of the substrate. As a result, there is a limit to improvement in production efficiency of the carbon nanotube twisted thread.

The present invention provides a method for producing a carbon nanotube twisted thread, and a production apparatus of a carbon nanotube twisted thread which are capable of industrially and efficiently producing a carbon nanotube twisted thread.

Means for Solving the Problem

The present invention [1] includes a method for producing a carbon nanotube twisted thread, the method including a step of drawing a plurality of carbon nanotubes so as to be continuous in lines out of vertically aligned carbon nanotubes disposed on a substrate and aligned vertically to the substrate, bunding the carbon nanotubes into a thread shape, and winding a temporary thread, bundled into the thread shape, around a first winder; and a step of feeding the temporary thread wound up from the first winder and rotating the first winder about an axis along a feeding direction of the temporary thread to twist the temporary thread.

According to such a method, the plurality of carbon nanotubes are drawn out of the vertically aligned carbon nanotubes so as to be continuous in lines, and are bundled into a thread shape, and the temporary thread thus bundled into a thread shape is temporarily wound on the first winder. Thereafter, the temporary thread is fed from the first winder and the first winder is rotated about the axis along the feeding direction of the temporary thread to twist the temporary thread.

Therefore, a connector for rotary connection is not necessary, and even as compared with a case of rotating the substrate, it is possible to stably rotate the first winder, and smoothly twist the temporary thread. As a result, it is possible to industrially and efficiently produce the carbon nanotube twisted thread.

The present invention [2] includes the method for producing a carbon nanotube twisted thread described in the above-described [1], wherein a filling ratio of the carbon nanotube in a cross section of the temporary thread when the temporary thread is cut in a direction perpendicular to a length direction is 0.3% in area or more and 75% in area or less.

According to such a method, since the plurality of linearly continuous carbon nanotubes are bundled into a thread shape so that the filling ratio of the carbon nanotube in the cross section of the temporary thread is the above-described lower limit or more, it is possible to stably form the temporary thread. Further, since the filling ratio of the carbon nanotube in the cross section of the temporary thread is the above-described upper limit or less, it is possible to suppress breakage of the temporary thread when the plurality of linearly continuous carbon nanotubes are bundled into a thread shape.

The present invention [3] includes the method for producing a carbon nanotube twisted thread described in the above-described [2], wherein a filling ratio of the carbon nanotube in the cross section of the temporary thread is 40% in area or less.

According to such a method, since the filling ratio of the carbon nanotube in the cross section of the temporary thread is the above-described upper limit or less, it is possible to stably twist the temporary thread fed from the first winder, and improve a tensile strength of the carbon nanotube twisted thread.

The present invention [4] includes the method for producing a carbon nanotube twisted thread described in any one of the above-described [1] to [3], wherein a filling ratio of the carbon nanotube in the cross section of the carbon nanotube twisted thread when the carbon nanotube twisted thread is cut in the direction perpendicular to the length direction is larger than the filling ratio of the carbon nanotube in the cross section of the temporary thread, and is 50% in area or more and 90% in area or less.

According to such a method, since the filling ratio of the carbon nanotube in the cross section of the carbon nanotube twisted thread is within the above-described range, it is possible to stably improve the tensile strength of the carbon nanotube twisted thread.

The present invention [5] includes the method for producing a carbon nanotube twisted thread described in any one of the above-described [1] to [4], wherein a twist angle of the temporary thread is 0° or more and 10° or less.

According to such a method, since the twist angle of the temporary thread is within the above-described range, it is possible to further more stably twist the temporary thread fed from the first winder.

The present invention [6] includes the method for producing a carbon nanotube twisted thread described in any one of the above-described [1] to [5], wherein a twist angle of the carbon nanotube twisted thread is 5° or more and 30° or less.

According to such a method, since the twist angle of the carbon nanotube twisted thread is within the above-described range, it is possible to further more stably improve the tensile strength of the carbon nanotube twisted thread.

The present invention [7] includes the method for producing a carbon nanotube twisted thread described in any one of the above-described [1] to [6], wherein the plurality of carbon nanotubes drawn so as to be continuous in lines are inserted into a hole to be bundled into the thread shape.

According to such a method, it is possible to stably bundle the plurality of linearly continuous carbon nanotubes into a thread shape even by a simple method.

The present invention [8] includes the method for producing a carbon nanotube twisted thread described in the above-described [7], wherein an inner diameter of the hole is 1/3000 or more and 1/100 or less with respect to a width of a drawing position of the carbon nanotube in the vertically aligned carbon nanotubes.

According to such a method, since the inner diameter of the hole is the above-described lower limit or more with respect to the width of the drawing position, it is possible to stably insert the plurality of linearly continuous carbon nanotubes into the hole. Further, since the inner diameter of the hole is the above-described upper limit or less with respect to the width of the drawing position, it is possible to adjust the filling ratio of the carbon nanotube in the cross section of the temporary thread within a predetermined range.

The present invention [9] includes the method for producing a carbon nanotube twisted thread described in any one of the above-described [1] to [8], wherein a second winder rotates and winds the carbon nanotube twisted thread obtained by twisting the temporary thread fed from the first winder.

According to such a method, since the second winder rotates and winds the carbon nanotube twisted thread, the first winder rotates following the rotation of the second winder, so that it is possible to continuously feed the temporary thread. Therefore, the second winder is drivingly rotated while the first winder is drivingly rotated about the axis along the feeding direction of the temporary thread, so that it is possible to continuously produce the carbon nanotube twisted thread.

The present invention [10] includes the method for producing a carbon nanotube twisted thread described in any one of the above-described [1] to [9] further including a step of extending the carbon nanotube twisted thread in the length direction.

According to such a method, since the carbon nanotube twisted thread is extended in the length direction, it is possible to improve the filling ratio of the carbon nanotube in the cross section of the carbon nanotube twisted thread, and further improve the tensile strength of the carbon nanotube twisted thread.

The present invention [11] includes a production apparatus of a carbon nanotube twisted thread, the apparatus including a temporary thread production unit including vertically aligned carbon nanotubes disposed on a substrate and aligned vertically to the substrate, a bundling portion for bundling a plurality of linearly continuous carbon nanotubes drawn out of the vertically aligned carbon nanotubes into a thread shape, and a first winder capable of winding a temporary thread bundled into the thread shape; and a twisted thread production unit including a second winder capable of winding the temporary thread fed from the first winder by rotational drive, and a support portion supporting the first winder to be followingly rotatable, the support portion being capable of drivingly rotating about an axis along a feeding direction of the temporary thread.

According to such a configuration, after the bundling portion bundles lines of continuous carbon nanotubes drawn out of the vertically aligned carbon nanotubes disposed on the substrate into a thread shape, the first winder temporarily winds the temporary thread.

Then, the second winder is drivingly rotated, thereby rotating the first winder followingly to continuously feed the temporary thread, and the support portion supporting the first winder drivingly rotates about the axis along the feeding direction of the temporary thread in order to twist the temporary thread. Thereafter, the second winder winds the twisted carbon nanotube twisted thread.

That is, the second winder drivingly rotates to continuously draw the temporary thread from the first winder and to wind the carbon nanotube twisted thread, and the support portion drivingly rotates so as to twist the temporary thread. Therefore, the second winder winds the carbon nanotube twisted thread while the temporary thread is twisted, whereby it is possible to simplify a configuration of a production apparatus of a carbon nanotube twisted thread, and industrially and efficiently produce the carbon nanotube twisted thread as compared with a case where the second winder drivingly rotates about two different axes.

The present invention [12] includes a production apparatus of a carbon nanotube twisted thread, the apparatus including a temporary thread production unit including vertically aligned carbon nanotubes disposed on a substrate and aligned vertically to the substrate, a bundling portion for bundling a plurality of linearly continuous carbon nanotubes drawn out of the vertically aligned carbon nanotubes into a thread shape, and a first winder capable of winding a temporary thread bundled into the thread shape; and a twisted thread production unit including a second winder capable of winding the temporary thread fed from the first winder by rotational drive, and a support portion supporting the second winder to be drivingly rotatable, the support portion being capable of drivingly rotating about an axis along a feeding direction of the temporary thread.

According to such a configuration, after the bundling portion bundles lines of continuous carbon nanotubes drawn out of the vertically aligned carbon nanotubes disposed on the substrate into a thread shape, the first winder temporarily winds the temporary thread. Then, the support portion supporting the second winder drivingly rotates about the axis along the feeding direction of the temporary thread to twist the temporary thread while the first winder continuously feeds the temporary thread. Thereafter, the second winder winds the twisted carbon nanotube twisted thread. Therefore, it is possible to industrially and efficiently produce the carbon nanotube twisted thread.

The present invention [13] includes a production apparatus of a carbon nanotube twisted thread, the apparatus including a temporary thread production unit including vertically aligned carbon nanotubes disposed on a substrate and aligned vertically to the substrate, a bundling portion for bundling a plurality of linearly continuous carbon nanotubes drawn out of the vertically aligned carbon nanotubes into a thread shape, and a first winder capable of winding a temporary thread bundled into the thread shape; and a twisted thread production unit including a second winder capable of winding the temporary thread fed from the first winder by rotational drive, and an intermediate thread twisting portion capable of twisting the temporary thread between the first winder and the second winder.

According to such a configuration, after the bundling portion bundles lines of continuous carbon nanotubes drawn out of the vertically aligned carbon nanotube disposed on the substrate into a thread shape, the first winder temporarily winds the temporary thread. Then, the second winder is drivingly rotated, thereby rotating the first winder followingly to continuously feed the temporary thread, and the intermediate thread twisting portion twists the temporary thread between the first winder and the second winder. Thereafter, the second winder winds the twisted carbon nanotube twisted thread. Therefore, it is possible to simplify the configuration of the production apparatus of a carbon nanotube twisted thread, and industrially and efficiently produce the carbon nanotube twisted thread.

Effect of the Invention

According to the method for producing a carbon nanotube twisted thread of the present invention, it is possible to industrially and efficiently produce a carbon nanotube twisted thread, and improve a strength of the carbon nanotube twisted thread. Further, it is possible to decrease a probability of the breakage of the carbon nanotube twisted thread as compared with a conventional production method.

According to the production apparatus of a carbon nanotube twisted thread of the present invention, it is possible to industrially and efficiently produce a carbon nanotube twisted thread while simplifying a configuration.

DESCRIPTION OF EMBODIMENTS

1. First Embodiment (1) Method for Producing Carbon Nanotube Twisted Thread

Figure 1:
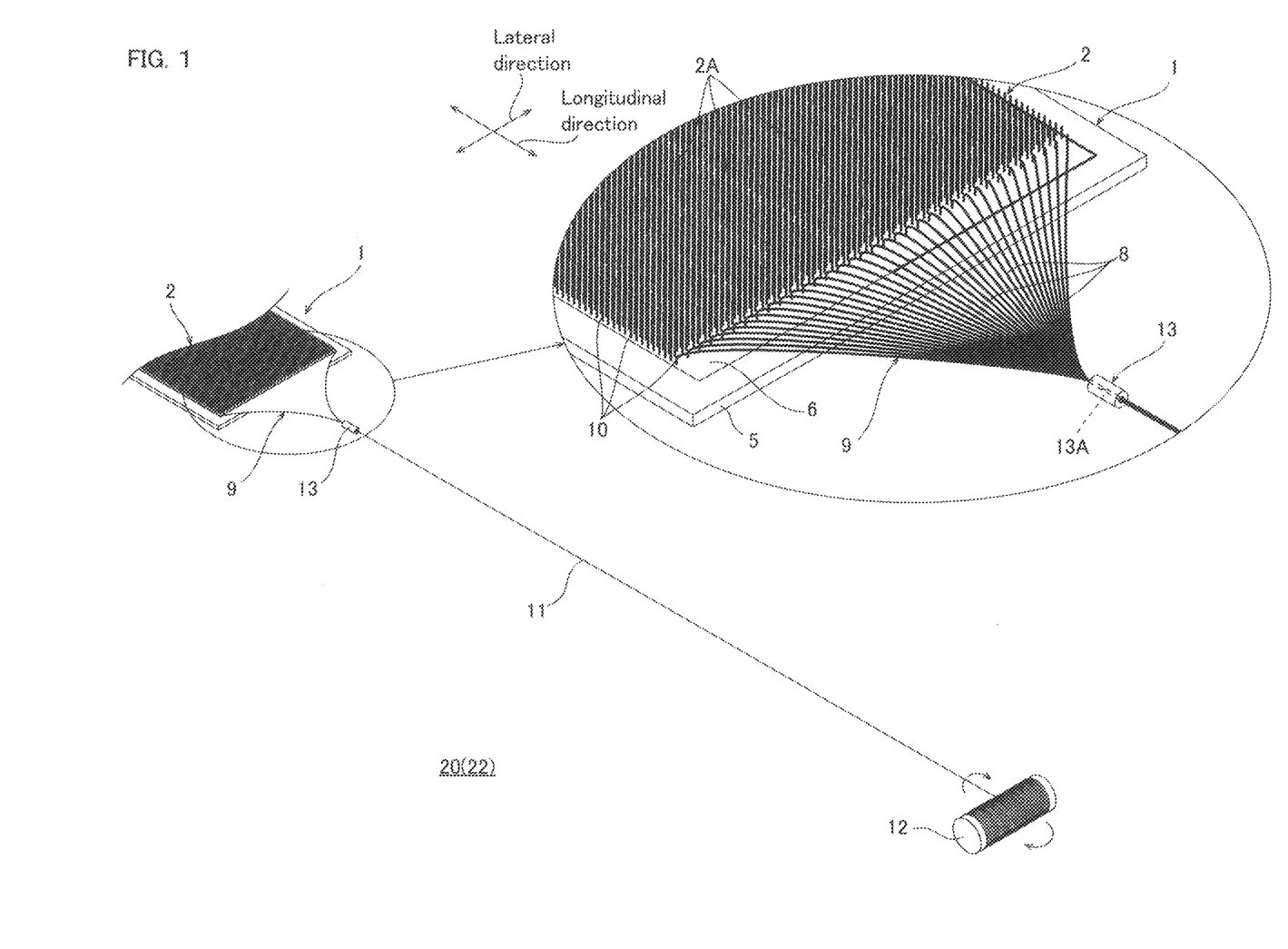
FIG. 1 shows a perspective view of a temporary thread production unit provided in a CNT twisted thread production apparatus as a first embodiment of a production apparatus of a carbon nanotube twisted thread of the present invention.
Figure 2:
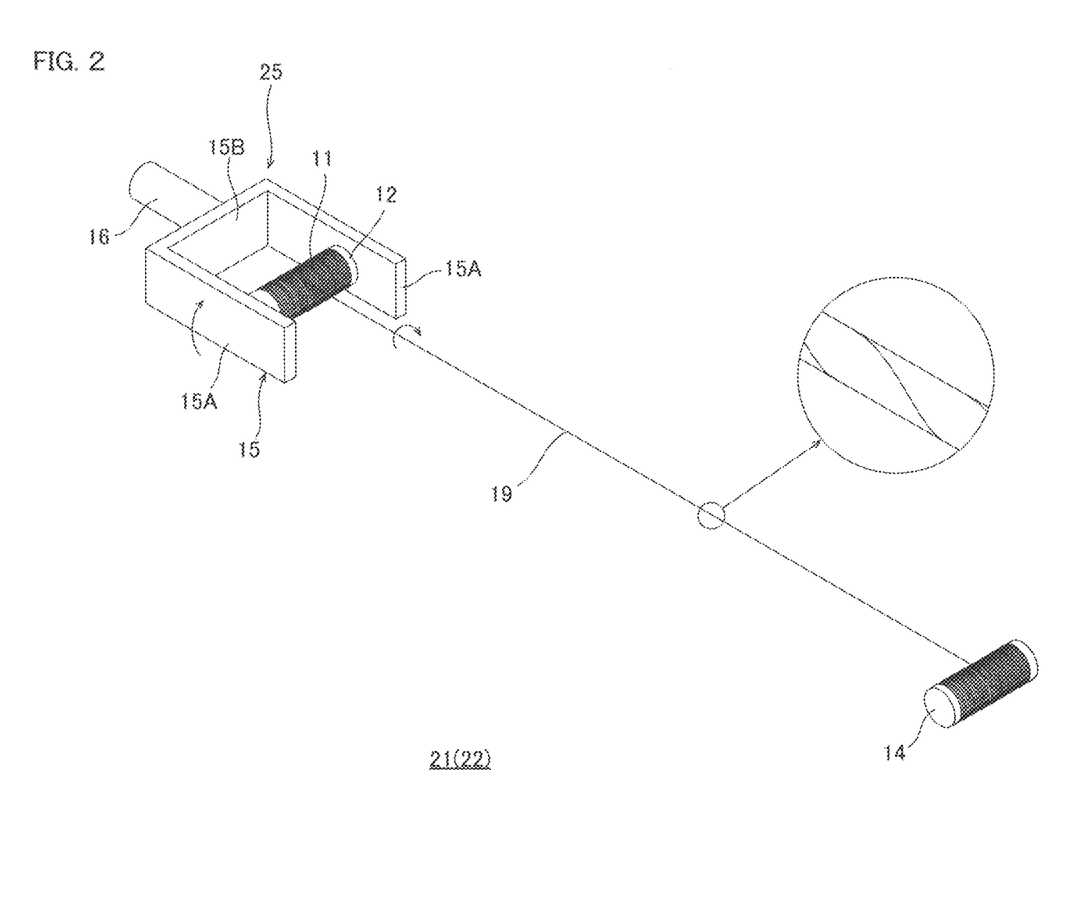
FIG. 2 shows a perspective view of a twisted thread production unit provided in a CNT twisted thread production apparatus as a first embodiment of a production apparatus of a carbon nanotube twisted thread of the present invention.

A first embodiment of a method for producing a carbon nanotube twisted thread of the present invention includes, for example, as shown in FIG. 1, a step of drawing a plurality of carbon nanotubes 10 (hereinafter referred to as a CNT 10) so as to be continuous in lines out of vertically aligned carbon nanotubes 2 (Vertically Aligned carbon nanotubes; hereinafter referred to as VACNTs 2) disposed on a substrate 1, bundling the carbon nanotubes 10 into a thread shape, and winding a temporary thread 11, thus bundled into a thread shape, around a first winder 12; and, as shown in FIG. 2, a step of twisting the temporary thread 11 while feeding the temporary thread 11 from the first winder 12.

In this production method, first, as shown in FIGS. 3A to 3D, the VACNTs 2 are grown on the substrate 1 by a chemical vapor deposition method (CVD method) to prepare the VACNTs 2 disposed on the substrate 1.

Figure 3A:
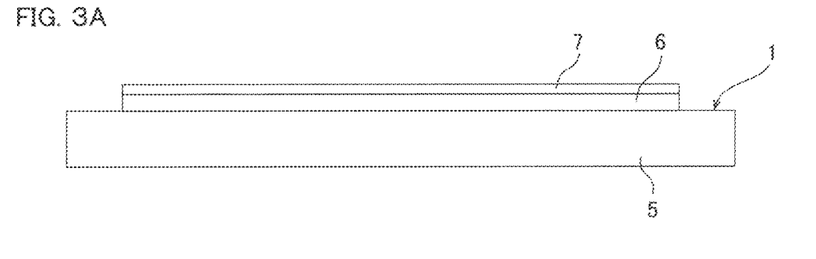
FIG. 3A shows a step of forming a catalyst layer on a substrate shown in FIG. 1.

Specifically, as shown in FIG. 3A, first, the substrate 1 is prepared. The substrate 1 is not particularly limited, an example thereof includes a known substrate used in CVD method, and a commercially available product can be used.

Examples of the substrate 1 include a silicon substrate, and a stainless steel substrate 5 on which a silicon dioxide film 6 is laminated, and preferably, the stainless steel substrate 5 on which the silicon dioxide film 6 is laminated is used. FIGS. 1 and 3A to 3D show a case where the substrate 1 is the stainless steel substrate 5 on which the silicon dioxide film 6 is laminated.

Then, as shown in FIG. 3A, a catalyst layer 7 is formed on the substrate 1, preferably on the silicon dioxide film 6. In order to form the catalyst layer 7 on the substrate 1, a metal catalyst film is formed on the substrate 1 (preferably, on the silicon dioxide film 6) by a known film-forming method.

Examples of the metal catalyst include iron, cobalt, and nickel, and preferably, iron is used. These metal catalysts may be used alone or in combination of two or more. Examples of the film-forming method include vacuum deposition and sputtering, and preferably, vacuum deposition is used. Thus, the catalyst layer 7 is disposed on the substrate 1.

Figure 3B:
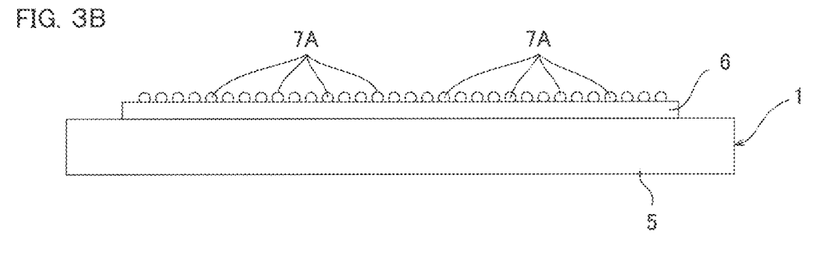
FIG. 3B, subsequent to FIG. 3A, shows a step of heating the substrate to aggregate the catalyst layer into a plurality of granules.

Next, as shown in FIG. 3B, the substrate 1 on which the catalyst layer 7 is disposed is, for example, heated at 700° C. or more and 900° C. or less. Thus, the catalyst layer 7 is aggregated into a plurality of granules 7A.

Figure 3C:
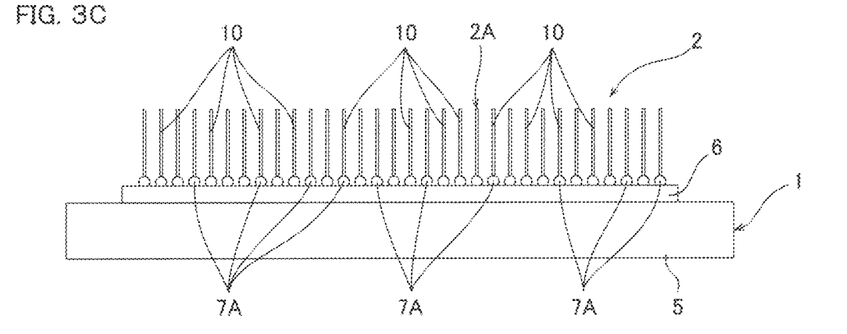
FIG. 3C, subsequent to FIG. 3B, shows a step of supplying a raw material gas to the plurality of granules to grow a plurality of carbon nanotubes.

Then, as shown in FIG. 3C, a raw material gas is supplied to the heated substrate 1. The raw material gas includes a hydrocarbon gas having 1 to 4 carbon atoms (lower hydrocarbon gas). Examples of the hydrocarbon gas having 1 to 4 carbon atoms include methane gas, ethane gas, propane gas, butane gas, ethylene gas, and acetylene gas, and preferably, acetylene gas is used.

Further, the raw material gas may also include, if necessary, a hydrogen gas, an inert gas (for example, helium, argon, and the like), water vapor, and the like.

The supply time of the raw material gas is, for example, one minute or more and 60 minutes or less.

Thus, the plurality of CNTs 10 are grown starting from each of the plurality of granules 7A. In FIG. 3C, for convenience, one CNT 10 is described to grow from one granule 7A, and the present invention is not limited to this. The plurality of CNTs 10 may also grow from one granule 7A.

Each of the plurality of CNTs 10 may be either a single-layer carbon nanotube or a multi-layer carbon nanotube, and is preferably a multi-layer carbon nanotube. These CNTs 10 may be used alone or in combination of two or more.

The CNT 10 has an average outer diameter of, for example, 1 nm or more and 100 nm or less. The CNT 10 has an average length (average length in an axial direction) of, for example, 1 µm or more, preferably 100 µm or more, more preferably 200 µm or more, and for example, 1000 µm or less, preferably 500 µm or less, more preferably 400 µm or less. Further, when the CNT 10 is a multi-layer CNT, the CNT 10 has an average inner diameter of, for example, 0.5 nm or more and 50 nm or less. The average inner diameter and the average outer diameter of the CNT 10 are measured with a field emission-type scanning electron microscope (FE-SEM). The average length of the CNT 10 is, for example, measured by a known method such as a laser displacement meter and a scanning electron microscope (SEM).

Each of the plurality of CNTs 10 extends in a thickness direction of the substrate 1 so as to be generally parallel to each other on the substrate 1. Thus, the VACNTs 2 consisting of the plurality of CNTs 10 grow on the substrate 1.

That is, the plurality of CNTs 10 are aligned so as to be perpendicular to the substrate 1 (aligned vertically), and the VACNTs 2 are aligned vertically to the substrate 1.

Thus, the VACNTs 2 disposed on the substrate 1 are prepared. As shown in FIG. 1, the VACNTs 2 form a generally rectangular shape, when viewed from the top, extending in a plane direction (longitudinal direction and lateral direction) perpendicular to the thickness direction (up-down direction) of the substrate 1. The VACNTs 2 include a plurality of rows 2A in the lateral direction in which the plurality of CNTs 10 are linearly disposed in alignment in the longitudinal direction. In the VACNTs 2, the plurality of CNTs 10 are in tight contact with each other in the plane direction (longitudinal direction and lateral direction).

The VACNTs 2 have bulk density of, for example, 10 $mg/cm^3$ or more, preferably 20 $mg/cm^3$ or more, and for example, 80 $mg/cm^3$ or less, preferably 60 $mg/cm^3$ or less. The bulk density of the VACNTs 2 is, for example, calculated from mass per unit area (basis weight, unit: $mg/cm^2$), and a length of the carbon nanotube (measured with SEM (manufactured by JEOL Ltd.) or laser displacement meter (manufactured by KEYENCE CORPORATION)).

Next, the plurality of CNTs 10 are drawn out of the VACNTs 2 so as to be continuous in lines.

Specifically, of the VACNTs 2, the CNT 10 located in one end portion in the longitudinal direction of each row 2A is collectively held with a drawer, not shown, and pulled away from the substrate 1.

Figure 3D:
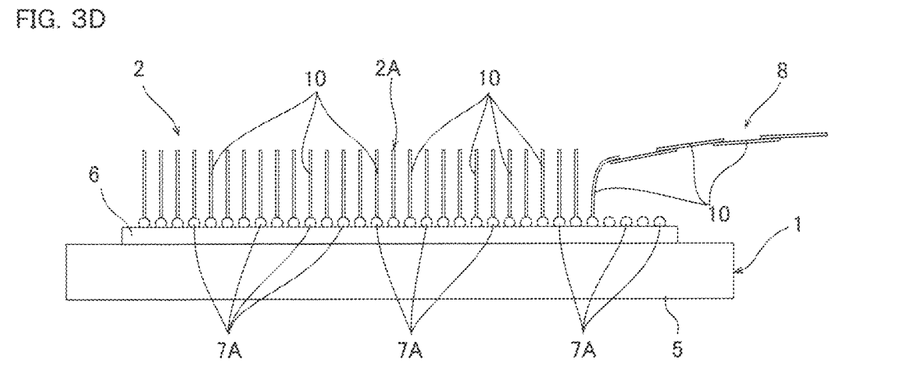
FIG. 3D, subsequent to FIG. 3C, shows a step of drawing the plurality of carbon nanotubes to prepare a carbon nanotube web.

Then, as shown in FIG. 3D, the pulled CNT 10 is pulled out of the granule 7A. At this time, the CNT 10 which is pulled out adheres to the neighboring CNT 10, and then, the adhering CNT 10 is pulled out of the granule 7A.

Thus, the plurality of CNTs 10 are sequentially and continuously drawn out of the VACNTs 2 to form a carbon nanotube single thread 8 (hereinafter referred to as a CNT single thread 8) in which the plurality of CNTs 10 are continuously connected linearly. In FIG. 3D, for convenience, the CNT single thread 8 is described to be formed by one-by-one continuous connection of the CNT 10, and actually, bundles consisting of CNTs 10 are continuously connected to form the CNT single thread 8.

The CNT single thread 8 is a non-twisted thread which is not twisted, and a twist angle thereof is generally 0°. The CNT single thread 8 has an outer diameter of, for example, 5 nm or more, and for example, 100 nm or less, preferably 80 nm or less.

Then, as shown by an enlarged view of FIG. 1, the plurality of CNT single threads 8 are disposed in parallel in the lateral direction since the CNTs 10 of rows 2A are drawn simultaneously and collectively. Thus, the CNT single threads 8 constitute a carbon nanotube web 9 having a generally sheet shape (hereinafter referred to as a CNT web 9).

Next, the CNT single threads 8, each being linearly continuous CNTs 10, are bundled into a thread shape. Specifically, the CNT single threads 8 are inserted into a hole 13A provided in a die 13 as one example of a bundling portion, and bundled into a thread shape. That is, the die 13 bundles the CNT single threads 8 drawn out of the VACNTS 2 into a thread shape.

The die 13 has a cylindrical shape, and has the hole 13A. An inner diameter of the hole 13A is, for example, 1/5000 or more, preferably 1/3000 or more, and for example, 1/50 or less, preferably 1/100 or less with respect to a width (that is, a lateral dimension of the VACNTs 2) of a drawing position of the CNT 10 in the VACNTs 2. When the CNT single thread 8 is drawn out of multiple set of VACNTs 2, the width of the drawing position of the CNT 10 in each of the VACNTs 2 may be summed.

When the inner diameter of the hole 13A is the above-described lower limit or more with respect to the width of the drawing position, it is possible to stably insert the CNT single threads 8 into the hole 13A. Further, since the inner diameter of the hole 13A is the above-described upper limit or less with respect to the width of the drawing position, it is possible to adjust a filling ratio of the CNT 10 in a cross section of the temporary thread 11 within a range to be described later.

In FIG. 1, for convenience, one die 13 is disposed, and the number of dies 13 is not particularly limited. The plurality of dies 13 may be also spaced apart from each other. In this case, the CNT single threads 8 are sequentially inserted into the holes 13A of the plurality of dies 13. In addition, the method for bundling the CNT single threads 8 into a thread shape is not limited to the above-described method, and for example, as described in International Publication No. 2015/011768, the CNT single threads 8 may be also bundled into a thread shape through a perforated pulley.

Thus, the CNT single threads 8 are bundled into a thread shape to form the temporary thread 11. The temporary thread 11 includes the CNT single threads 8 aligned in the length direction of the temporary thread 11.

The filling ratio of the CNT 10 in the cross section of the temporary thread 11 when the temporary thread 11 is cut in a direction perpendicular to the length direction is, for example, 0.01% in area or more, preferably 0.3% in area or more, and for example, 90% in area or less, preferably 75% in area or less, more preferably 40% in area or less, particularly preferably 30% in area or less. The filling ratio can be, for example, calculated as follows. Further, in the description of the calculation of the filling ratio, the CNT is preferably a multi-layer CNT, and a CNT thread refers to the temporary thread 11 or a CNT twisted thread 19 (described later).

First, as shown in Formula (1) below, the mass per CNT is calculated.

Formula 1

Formula (1)

$$W_{CNT} = \frac{\pi}{4}(d_{out}^2 - d_{in}^2) \times h \times \rho_{grap} \quad (1)$$

(In Formula (1), $d_{out}$ indicates an outer diameter per CNT. $d_{in}$ indicates an inner diameter per CNT. h indicates an average length per CNT. $\rho_{grap}$ indicates the density of graphite, which is 2.25 g/cm³ (source: page 445 of "Chronological Scientific Tables 2001" (edited by National Astronomical Observatory of the Ministry of Education, H13).)

The outer diameter and the inner diameter per CNT can be measured by an SEM image or a laser dimension meter. An average length per CNT is determined by measuring a film thickness of the VACNTs 2 on the substrate.

Then, as shown by Formula (2) below, the number of CNTs per average length (hereinafter referred to as "per unit") of the one CNT in the CNT thread is calculated.

Formula 2

Formula (2)

$$N_{CNT} = \frac{W_{thread}}{W_{CNT}} \quad (2)$$

(In Formula (2), $N_{CNT}$ indicates the number of CNTs per unit in the CNT thread. $W_{thread}$ indicates the mass per unit of the CNT thread. $W_{CNT}$ indicates the mass of the one CNT.)

When the filling ratio of the CNT in the cross section of the temporary thread 11 is calculated, $N_{CNT}$ indicates the number of CNTs per unit in the temporary thread 11, and $W_{thread}$ indicates the mass per unit of the temporary thread 11. Further, when the filling ratio of the CNT in the cross section of the CNT twisted thread 19 is calculated, $N_{CNT}$ indicates the number of CNTs per unit in the CNT twisted thread 19, and $W_{thread}$ indicates the mass per unit of the CNT twisted thread 19.

Next, as shown by Formula (3) below, the filling ratio of the CNT in the cross section of the CNT thread (the temporary thread 11 or the CNT twisted thread 19) is calculated.

Formula 3

Formula (3)

$$\text{Filling Ratio [\% in area]} = \frac{S_{CNT} \times N_{CNT}}{S_{thread}} \times 100 \quad (3)$$

(In Formula (3), $S_{CNT}$ indicates the cross-sectional area per CNT. $S_{thread}$ indicates the cross-sectional area of the CNT thread. $N_{CNT}$ is the same as $N_{CNT}$ in Formula (2).)

The cross-sectional area ($S_{CNT}$) per CNT is calculated by Formula (4) below.

Formula 4

Formula (4)

$$S_{CNT} = \frac{d_{out}^2}{4}\pi \quad (4)$$

(In Formula (4), $d_{out}$ is the same as $d_{out}$ in Formula (1).)

Further, the cross-sectional area ($S_{thread}$) of the CNT thread is calculated by Formula (5) below.

Formula 5

Formula (5)

$$S_{thread} = \frac{d_{thread}^2}{4}\pi \quad (5)$$

(In Formula (5), $d_{thread}$ indicates an outer diameter of the CNT thread.)

When the filling ratio of the CNT in the cross section of the temporary thread 11 is calculated, $S_{thread}$ indicates the cross-sectional area in cutting the temporary thread 11 in the direction perpendicular to the length direction, and when the filling ratio of the CNT in the cross section of the CNT twisted thread 19 is calculated, $S_{thread}$ indicates the cross-sectional area in cutting the CNT twisted thread 19 in the direction perpendicular to the length direction.

When the filling ratio of the CNT 10 in the cross section of the temporary thread 11 is the above-described lower limit or more, it is possible to stably form the temporary thread 11. When the filling ratio of the CNT 10 in the cross section of the temporary thread 11 is the above-described upper limit or less, it is possible to suppress breakage of the temporary thread 11 at the time of bundling the CNT single threads 8. In particular, when the filling ratio of the CNT 10 in the cross section of the temporary thread 11 is 40% in area or less, it is possible to stably twist the temporary thread 11 in a step of twisting the temporary thread 11 to be described later, and improve a tensile strength of the carbon nanotube twisted thread 19 to be described later (hereinafter referred to as the CNT twisted thread 19).

Further, the temporary thread 11 has a twist angle of, for example, 0° or more, and 10° or less, preferably 5° or less. That is, the temporary thread 11 may be a non-twisted thread having a twist angle of 0°, or may be a twisted thread having a twist angle of 10° or less. To form the twisted thread from the temporary thread 11, the above-described die 13 is rotated about an axis of the die 13, and the temporary thread 11 is twisted.

When the twist angle of the temporary thread 11 is within the above-described range, in a step of twisting the temporary thread 11 to be described later, it is possible to further more stably twist the temporary thread 11.

Next, the temporary thread 11 bundled into a thread shape is wound on the first winder 12.

The first winder 12 is capable of winding the temporary thread 11. The first winder 12 has a columnar shape. The first winder 12 is capable of rotating about an axis of the first winder 12. An outer diameter of the first winder 12 is not particularly limited, and is, for example, 1 mm or more and 300 mm or less, preferably 10 mm or more and 100 mm or less. A dimension in the axis direction of the first winder 12 is not particularly limited, and is, for example, 10 mm or more and 100 mm or less. Then, a driving force is input from an external driving source, not shown, to the first winder 12, and the first winder 12 drivingly rotates about the axis of the first winder 12, so that the temporary thread 11 is wound around a circumferential surface of the first winder 12.

Thus, the temporary thread 11 is pulled toward the downstream in a moving direction, and along with this, the CNT single threads 8 are continuously drawn out of the VACNTs 2, inserted into the die 13, and then continuously wound around the first winder 12 as the temporary thread 11.

At this time, the temporary thread 11 has a moving rate of, for example, 1 m/min or more, preferably 50 m/min or more, more preferably 100 m/min or more, and for example, 300 m/min or less.

Then, as shown in FIG. 2, the temporary thread 11 is twisted while the wound temporary thread 11 is fed from the first winder 12.

Specifically, first, the first winder 12 which has wound the temporary thread 11 is attached to a twisting portion 25. The twisting portion 25 includes a support portion 15 and a rotation shaft 16.

The support portion 15 has a generally U-shape. The support portion 15 has two side walls 15A and a connecting wall 15B. The two side walls 15A are capable of attaching the first winder 12 therebetween, and are spaced apart from each other in the axis direction of the first winder 12. A driving force is not input from an external driving source, not shown, into the first winder 12 in a state of being supported by the two side walls 15A. The two side walls 15A support the first winder 12 to be followingly rotatable. The connecting wall 15B is spaced apart from the first winder 12 and connects the end portions of the two side walls 15A.

The rotation shaft 16 is located at the side opposite to the first winder 12 with respect to the connecting wall 15B. One end portion of the rotation shaft 16 is fixed to the center of the connecting wall 15B. Further, a driving force is input from an external driving source, not shown, into the rotation shaft 16, and the rotation shaft 16 rotates about an axis of the rotation shaft 16. Thus, the support portion 15 is capable of drivingly rotating about the axis of the rotation shaft 16. The axis of the rotation shaft 16 is along the feeding direction of the temporary thread 11 to be described later.

Next, the temporary thread 11 fed from the first winder 12 is passed over to the second winder 14.

The second winder 14 is capable of winding the temporary thread 11 fed from the first winder 12 by rotational drive. The second winder 14 has a columnar shape. The second winder 14 is capable of rotating about an axis of the second winder 14. An outer diameter of the second winder 14 is not particularly limited, and is, for example, 1 mm or more and 300 mm or less, preferably 10 mm or more and 100 mm or less. A dimension in the axis direction of the second winder 14 is not particularly limited, and is, for example, 1 mm or more and 300 mm or less.

Then, a driving force is input from an external driving source, not shown, into the second winder 14, and a driving force is input from an external driving source, not shown, into the rotation shaft 16. Then, the second winder 14 drivingly rotates about the axis of the second winder 14, and the support portion 15 drivingly rotates about the axis of the rotation shaft 16.

At this time, the temporary thread 11 is pulled by the rotating second winder 14, which rotates the first winder 12 followingly from which the temporary thread 11 is continuously fed. Then, the support portion 15 rotates about the axis (axis of the rotation shaft 16) along the feeding direction of the temporary thread 11, so that the first winder 12 rotates about the axis along the feeding direction along with the support portion 15 to twist the temporary thread 11. Thereafter, the second winder 14 rotates and winds the CNT twisted thread 19 obtained by twisting the temporary thread 11 fed from the first winder 12.

That is, the first winder 12 is rotated about the axis along the feeding direction of the temporary thread 11 while the temporary thread 11 is fed from the first winder 12, and the temporary thread 11 is twisted and then wound around the second winder 14.

In FIG. 2, the first winder 12 rotates about the axis along the feeding direction along with the support portion 15 to twist the temporary thread 11. However, the case is not limited to this. For example, the support portion may support the second winder 14 rotatably, and the second winder 14 may also rotate about the axis along the feeding direction along with the support portion to twist the temporary thread 11.

In addition, the temporary thread 11 may be wound around the second winder 14 after passing through an intermediate thread twisting portion for twisting the temporary thread 11 between the first winder 12 and the second winder 14, where the intermediate thread twisting portion is disposed between the first winder 12 and the second winder 14, and the temporary thread 11 is fed from the first winder 12. For example, as described in International Publication No. 2015/011768, the temporary thread 11 is twisted by a swirling flow of compressed air ("air") in the thread production portion, and then, it may be wound around the second winder 14.

Thus, the CNT single threads 8 provided in the temporary thread 11 are twisted to each other, and the CNT twisted thread 19 (CNT wire) is produced.

The CNT twisted thread 19 has number of twists of, for example, 500 T/m or more, preferably 1000 T/m or more, more preferably 3000 T/m or more, and for example, 7000 T/m or less, preferably 5000 T/m or less.

Further, when the CNT twisted thread 19 is cut in the direction perpendicular to the length direction, the filling ratio of the CNT 10 in the cross section of the CNT twisted thread 19 is larger than that of the CNT 10 in the cross section of the temporary thread 11. The filling ratio of the CNT 10 in the cross section of the CNT twisted thread 19 is, for example, 30% in area or more, preferably above 40% in area, further more preferably 50% in area or more, and for example, 90% in area or less, preferably 85% in area or less. The filling ratio of the CNT 10 in the cross section of the CNT twisted thread 19 can be calculated by the above-described way.

When the filling ratio of the CNT 10 in the cross section of the CNT twisted thread 19 is within the above-described range, it is possible to stably improve the tensile strength of the CNT twisted thread 19.

Further, the CNT twisted thread 19 has a twist angle of, for example, 1° or more, preferably 5° or more, further more preferably 10° or more, and for example, 60° or less, preferably 50° or less, further more preferably 30° or less.

Since the twist angle of the CNT twisted thread 19 is within the above-described range, it is possible to further more stably improve the tensile strength of the CNT twisted thread 19.

The CNT twisted thread 19 has the tensile strength of, for example, 200 MPa or more, preferably 600 MPa or more, more preferably 800 MPa or more, and for example, 2000 MPa or less, preferably 1200 MPa or less. The tensile strength of the CNT twisted thread can be calculated as follows: one end of the CNT twisted thread is fixed, the other end of the CNT twisted thread is fixed to a force gauge, the thread is pulled up at 0.2 mm/sec to obtain a load on rupturing as a breaking strength, and the breaking strength is divided by the cross-sectional area of the CNT twisted thread.

The above-described method for producing the CNT twisted thread 19 is, for example, carried out with a CNT twisted thread production apparatus 22 as one example of a production apparatus of a carbon nanotube twisted thread. The CNT twisted thread production apparatus 22 includes a temporary thread production unit 20 shown in FIG. 1, and a twisted thread production unit 21 shown in FIG. 2. In the description of the CNT twisted thread production apparatus 22, the same reference numerals are provided for members corresponding to each of those in the above-described members, and the description thereof is omitted.

As shown in FIG. 1, the temporary thread production unit 20 includes the VACNTs 2 disposed on the substrate 1, the die 13, and the first winder 12. As shown in FIG. 2, the twisted thread production unit 21 includes the second winder 14 and the twisting portion 25.

In the CNT twisted thread production apparatus 22, as described above, the CNT single threads 8 are drawn out of the VACNTs 2, and the CNT single threads 8 are inserted into the hole 13A provided in the die 13 to be bundled into a thread shape. Thereafter, the temporary thread 11 obtained by bundling the CNT single threads 8 into a thread shape is passed over to the first winder 12, and the first winder 12 is rotationally driven.

Thus, the temporary thread 11 is pulled by the rotation of the first winder 12, the CNT single threads 8 are continuously drawn out of the VACNTs 2 and inserted into the die 13, and then the CNT single threads 8 are continuously wound on the first winder 12 as the temporary thread 11.

Thus, the temporary thread production unit 20 produces the temporary thread 11 wound around the first winder 12.

Thereafter, the first winder 12 around which the temporary thread 11 is wound is removed from the temporary thread production unit 20. Then, the first winder 12 is attached to the support portion 15, and then, the temporary thread 11 is fed from the first winder 12 to be passed over to the second winder 14.

Then, the second winder 14 is drivingly rotated about the axis of the second winder 14, and the support portion 15 is drivingly rotated about the axis of the rotation shaft 16.

Thus, the temporary thread 11 is continuously fed from the first winder 12 by being pulled by the rotation of the second winder 14, and is twisted by the rotation of the support portion 15. Thereafter, the second winder 14 rotates and winds the CNT twisted thread 19.

Thus, the CNT twisted thread 19 is produced with the CNT twisted thread production apparatus 22.

The CNT twisted thread 19 is, for example, used in various industrial products such as textiles (sheets) using carbon fibers, and electrically conductive wire materials for electrical devices (for example, motors, transformers, sensors, and the like).

(2) Function and Effect

As shown in FIGS. 1 and 2, in the above-described method for producing the CNT twisted thread 19, the plurality of CNTs 10 are drawn out of the VACNTs 2 so as to be continuous in lines, and bundled into a thread shape; and the temporary thread 11, thus bundled into a thread shape, is temporarily wound around the first winder 12. Thereafter, the first winder 12 is rotated about the axis along the feeding direction of the temporary thread 11 to twist the temporary thread 11 while the temporary thread 11 is fed from the first winder 12.

Therefore, it is possible to stably rotate the first winder 12 about the axis along the feeding direction, and smoothly twist the temporary thread 11. As a result, it is possible to industrially and efficiently produce the CNT twisted thread 19. Further, it is possible to decrease a probability of the breakage of the CNT twisted thread 19 as compared with a conventional production method.

Further, the CNT single threads 8 are bundled so that the filling ratio of the CNT 10 in the cross section of the temporary thread 11 is the above-described lower limit or more. Therefore, it is possible to stably form the temporary thread 11. Also, the filling ratio of the CNT 10 in the cross section of the temporary thread 11 is the above-described upper limit or less. Therefore, when the CNT single threads 8 are bundled into a thread shape, it is possible to suppress breakage of the temporary thread 11. Furthermore, when the filling ratio of the CNT 10 in the cross section of the temporary thread 11 is 40% in area or less, it is possible to stably twist the temporary thread 11 fed from the first winder 12, and improve the tensile strength of the CNT twisted thread 19.

Further, the filling ratio of the CNT 10 in the cross section of the CNT twisted thread 19 is within the above-described range. Therefore, it is possible to stably improve the tensile strength of the CNT twisted thread 19.

Further, the twist angle of the temporary thread 11 is within the above-described range. Therefore, it is possible to further more stably twist the temporary thread 11 fed from the first winder 12.

Further, the twist angle of the CNT twisted thread 19 is within the above-described range. Therefore, it is possible to further more stably improve the tensile strength of the CNT twisted thread 19.

Further, the CNT single threads 8 are inserted into the hole 13A of the die 13 to be bundled into a thread shape. Therefore, it is possible to stably bundle the CNT single threads 8 into a thread shape even by a simple method.

Further, the inner diameter of the hole 13A is the above-described lower limit or more with respect to the width of the drawing position of the CNT 10 in the VACNTs 2. Therefore, it is possible to stably insert the CNT single threads 8 into the hole 13A. Further, the inner diameter of the hole 13A is the above-described upper limit or less with respect to the width of the drawing position. Therefore, it is possible to adjust the filling ratio of the CNT 10 in the cross section of the temporary thread 11 within the above-described range.

Further, the second winder 14 rotates and winds the CNT twisted thread 19 which is obtained by twisting the temporary thread 11 fed from the first winder 12. Therefore, the first winder 12 rotates following the rotation of the second winder 14, so that it is possible to continuously feed the temporary thread 11. As a result, the second winder 14 is drivingly rotated while the first winder 12 is drivingly rotated about the axis along the feeding direction, so that it is possible to continuously produce the CNT twisted thread 19.

Further, the above-described method for producing the CNT twisted thread 19 is carried out with the CNT twisted thread production apparatus 22. Specifically, after the die 13 bundles the CNT single threads 8 drawn out of the VACNTs 2 into a thread shape, the first winder 12 temporarily winds the temporary thread 11. Then, the second winder 14 is drivingly rotated, thereby rotating the first winder 12 followingly to continuously feed the temporary thread, and the support portion 15 supporting the first winder 12 drivingly rotates about the axis along the feeding direction in order to twist the temporary thread 11. Thereafter, the second winder 14 winds the twisted CNT twisted thread 19.

The second winder 14 winds the CNT twisted thread 19 while the temporary thread 11 is twisted, whereby it is possible to simplify a configuration of the CNT twisted thread production apparatus 22, and industrially and efficiently produce the CNT twisted thread 19 as compared with a case where the second winder drivingly rotates about two different axes.

As the twisted thread production unit 21, a commonly available twisted thread machine may be also used.

2. Second Embodiment

Next, a second embodiment of the present invention is described with reference to FIG. 4. In the second embodiment, the same reference numerals are provided for members corresponding to each of those in the above-described first embodiment, and their detailed description is omitted.

Figure 4:
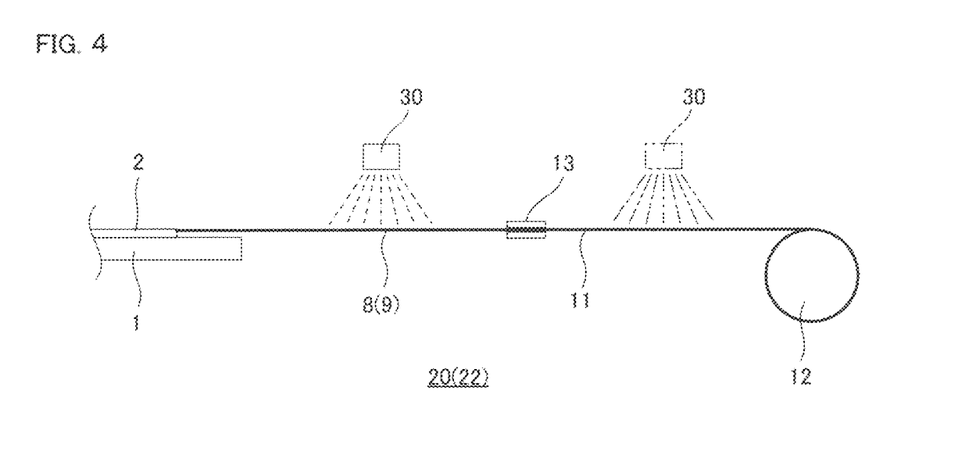
FIG. 4 shows a schematic configuration view of a temporary thread production unit provided in a CNT twisted thread production apparatus as a second embodiment of a production apparatus of a carbon nanotube twisted thread of the present invention.

As shown in FIG. 4, the second embodiment of the method for producing a carbon nanotube twisted thread of the present invention further includes a step of supplying a volatile liquid to the CNT single threads 8 drawn out of the VACNTs 2.

Examples of the volatile liquid include water and an organic solvent, and preferably, an organic solvent is used. Examples of the organic solvent include lower (C1 to C3) alcohols (for example, methanol, ethanol, propanol, and the like), ketones (for example, acetone and the like), ethers (for example, diethyl ether, tetrahydrofuran, and the like), alkyl esters (for example, ethyl acetate and the like), halogenated aliphatic hydrocarbons (for example, chloroform, dichloromethane, and the like), and polar aprotones (for example, N-methylpyrrolidone, dimethylformamide, and the like).

Of the volatile liquids, preferably, lower alcohols are used, more preferably, ethanol is used. These volatile liquids may be used alone or in combination of two or more. In addition, in the volatile liquid, fine particles may be dispersed, or a metal salt and/or a resin material may be also dissolved.

The volatile liquid may be supplied to the CNT single threads 8 (the CNT web 9) on the upstream-side of the die 13, may be supplied to the CNT single threads 8 (the temporary thread 11) on the downstream-side of the die 13, or may be supplied to both of them in the moving direction of the temporary thread 11. From the viewpoint of uniformly impregnating the volatile liquid into the temporary thread 11, preferably, the volatile liquid is supplied to the CNT single threads 8 (the CNT web 9) on the upstream-side of the die 13 in the moving direction of the temporary thread 11.

Then, in order to supply the volatile liquid to the CNT single threads 8, for example, the volatile liquid is sprayed in a mist state toward the CNT single threads 8. In such a case, the temporary thread production unit 20 of the CNT twisted thread production apparatus 22 includes a spray portion 30.

In the present embodiment, the spray portion 30 is disposed so as to face the plurality of CNT webs 9 located between the VACNTs 2 and the die 13. Further, as shown by a phantom line, the spray portion 30 may be also disposed so as to face the temporary thread 11 located between the die 13 and the first winder 12. The spray portion 30 is capable of spraying the above-described volatile liquid.

Then, the CNT single threads 8 to which the volatile liquid is supplied are dried if necessary, and then, wound on the first winder 12 as the temporary thread 11.

The method for supplying the volatile liquid to the CNT single threads 8 is not limited to the description above, and for example, the CNT single threads 8 may be immersed in the volatile liquid.

In the second embodiment, the volatile liquid is vaporized, so that the plurality of CNTs 10 aggregate with each other in each CNT single thread 8, and the CNT single threads 8 aggregate with each other in the temporary thread 11. Therefore, it is possible to improve the filling ratio of the CNT 10 in the cross section of the temporary thread 11.

In addition, when the fine particles are dispersed, or the metal salt and/or the resin material are/is dissolved in the volatile liquid, such other materials can be composited into the temporary thread 11, and accordingly, such other materials can be composited into the CNT twisted thread 19.

In the second embodiment, the same function and effect as that of the above-described first embodiment can be achieved.

3. Third Embodiment

Next, a third embodiment of the present invention is described with reference to FIGS. 5A and 5B. In the third embodiment, the same reference numerals are provided for members corresponding to each of those in the above-described first embodiment, and their detailed description is omitted.

Figure 5A:
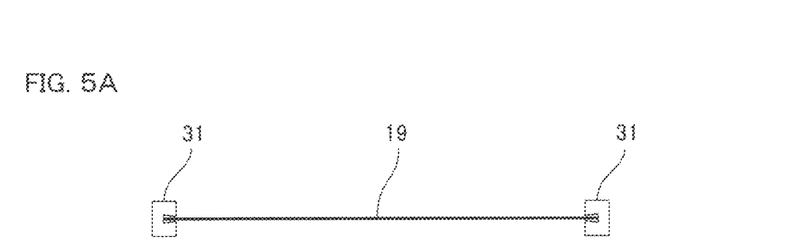
FIG. 5A shows an explanatory view for illustrating a step of extending a carbon nanotube twisted thread included in a third embodiment of a method for producing a carbon nanotube twisted thread of the present invention, and shows a state of holding an end portion of the carbon nanotube twisted thread.
Figure 5B:
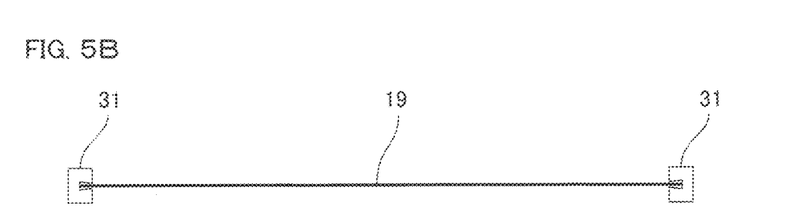
FIG. 5B, subsequent to FIG. 5A, shows a state of extending the carbon nanotube twisted thread.

As shown in FIGS. 5A and 5B, the third embodiment of the method for producing a carbon nanotube twisted thread of the present invention further includes a step of extending the CNT twisted thread 19 in the length direction.

For example, by holding both ends of the CNT twisted thread 19 fed from the second winder 14 with holding members 31, the CNT twisted thread 19 is extended in the length direction.

Thus, it is possible to improve the filling ratio of CNT 10 in the cross section of the CNT twisted thread 19, and further improve the tensile strength of the CNT twisted thread 19.

diameter of the hole of the die with a drawing width of the CNT single threads (the amount of CNT) out of the VACNTs as the same. Thereafter, the first winder was drivingly rotated, and the temporary thread obtained by bundling the CNT single threads into a thread shape was wound on the first winder.

Figure 6:
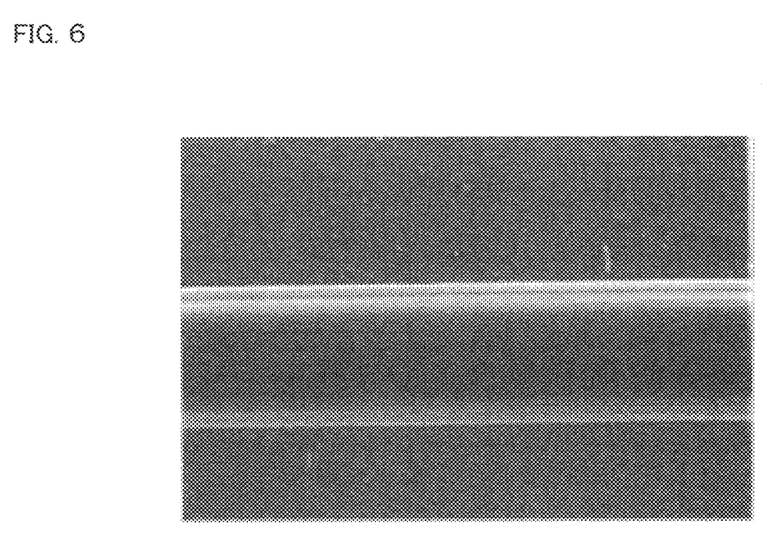
FIG. 6 shows a scanning electron microscope (SEM) image of a temporary thread of Production Example 4.

Thus, the temporary thread was produced. A filling ratio of the CNT in a cross section of the temporary thread, a twist angle of the temporary thread, and a diameter of the temporary thread are shown in Table 1. Furthermore, a scanning electron microscope (SEM) image of the temporary thread of Production Example 4 is shown in FIG. 6.

TABLE 1

| | | No. | | | | | |
| --- | --- | --- | --- | --- | --- | --- | --- |
| | | Production Ex. 1 | Production Ex. 2 | Production Ex. 3 | Production Ex. 4 | Production Ex. 5 | Production Ex. 6 |
| Temporary Thread | Filling Ratio [% in area] | 0.3 | 3.2 | 10 | 30 | 50 | 75 |
| | Twist Angle [°] | 0 | 0 | 0 | 0 | 0 | 0 |
| | Diameter [μm] | 513 | 163 | 81 | 52 | 43 | 33 |

The method for extending the CNT twisted thread 19 is not limited to the description above, and the CNT twisted thread 19 may be, for example, extended while the temporary thread 11 is twisted in the twisted thread production unit 21.

In the third embodiment, the same function and effect as that of the above-described first embodiment can be achieved. Further, the first embodiment to the third embodiment can be appropriately used in combination.

EXAMPLES

Next, the present invention is further described based on Examples below. The present invention is however not limited by these. The specific numerical values in mixing ratio (content ratio), property value, and parameter used in the following description can be replaced with upper limit values (numerical values defined as "or less" or "below") or lower limit values (numerical values defined as "or more" or "above") of corresponding numerical values in mixing ratio (content ratio), property value, and parameter described in the above-described "DESCRIPTION OF EMBODIMENTS".

Production Examples 1 to 6

After laminating a silicon dioxide film on the surface of a substrate made of stainless steel (stainless steel substrate), iron was deposited on the silicon dioxide film as a catalyst layer. Then, the substrate was heated at a predetermined temperature, and a raw material gas (acetylene gas) was to supped to the catalyst layer. Thus, VACNTs forming a generally rectangular shape when viewed from the top were formed on the substrate.

Next, CNT single threads were drawn out of the VACNTs, and the CNT single threads were inserted into a hole of a die and bundled into a thread shape so that a filling ratio of a temporary thread showed the value in Table 1. The filling ratio of the temporary thread was adjusted by an inner Examples 1 to 5

A temporary thread (filling ratio of 0.3% in area) of Production Example 1 was fed from the first winder, and the first winder was rotated about an axis along the feeding direction of the temporary thread to twist the temporary thread so that number of twists of the CNT twisted thread was the value shown in Table 2.

Thus, the CNT twisted thread was produced. The number of twists of the CNT twisted thread, a twist angle of the CNT twisted thread, a diameter of the CNT twisted thread, a filling ratio of the CNT in a cross section of the CNT twisted thread, and a tensile strength of the CNT twisted thread are shown in Table 2.

Examples 6 to 11

A temporary thread (filling ratio of 30% in area) of Production Example 4 was fed from the first winder, and the first winder was rotated about an axis along the feeding direction of the temporary thread to twist the temporary thread so that number of twists of the CNT twisted thread was the value shown in Table 3.

Figure 7:
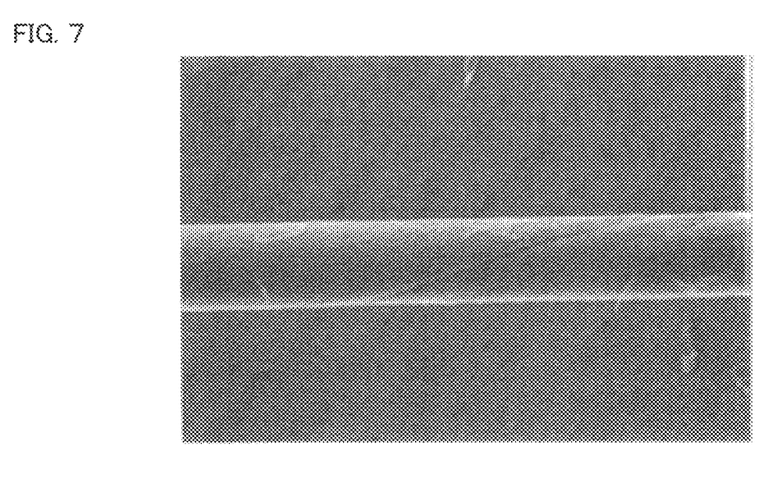
FIG. 7 shows a scanning electron microscope (SEM) image of a carbon nanotube twisted thread of Example 9.

Thus, the CNT twisted thread was produced. The number of twists of the CNT twisted thread, a twist angle of the CNT twisted thread, a diameter of the CNT twisted thread, a filling ratio of the CNT in a cross section of the CNT twisted thread, and a tensile strength of the CNT twisted thread are shown in Table 3. Further, a scanning electron microscope (SEM) image of the CNT twisted thread of Example 9 is shown in FIG. 7.

Examples 12 to 16

A temporary thread (filling ratio of 75% in area) of Production Example 6 was fed from the first winder, and the first winder was rotated about an axis along the feeding direction of the temporary thread to twist the temporary thread so that number of twists of the CNT twisted thread was the value shown in Table 4.

Thus, the CNT twisted thread was produced. The number of twists of the CNT twisted thread, and a tensile strength of the CNT twisted thread are shown in Table 4.

TABLE 2

| No. | Ex. 1 | Ex. 2 | Ex. 3 | Ex. 4 | Ex. 5 |
|---|---|---|---|---|---|
| Filling Ratio of Temporary Thread [% in area] | 0.3 | 0.3 | 0.3 | 0.3 | 0.3 |
| Number of Twists [T/m] | 1000 | 3000 | 4000 | 5000 | 7000 |
| Twist Angle [°] | — | — | — | 25 | — |
| Diameter [μm] | 39 | 33 | 31 | 27 | 28 |
| Filling Ratio of CNT Twisted Thread [% in area] | 42 | 58 | 66 | 87 | 81 |
| Tensile Strength [MPa] | 300 | 600 | 800 | 1050 | 650 |

TABLE 3

| No. | Ex. 6 | Ex. 7 | Ex. 8 | Ex. 9 | Ex. 10 | Ex. 11 |
|---|---|---|---|---|---|---|
| Filling Ratio of Temporary Thread [% in area] | 30 | 30 | 30 | 30 | 30 | 30 |
| Number of Twists [T/m] | 500 | 1000 | 2000 | 3000 | 4000 | 5000 |
| Twist Angle [°] | — | 10 | — | — | 25 | 30 |
| Diameter [μm] | 40 | 38 | 34 | 31 | 29 | 29 |
| Filling Ratio of CNT Twisted Thread [% in area] | 40 | 44 | 55 | 66 | 75 | 75 |
| Tensile Strength [MPa] | 350 | 400 | 550 | 800 | 900 | 700 |

TABLE 4

| No. | Ex. 12 | Ex. 13 | Ex. 14 | Ex. 15 | Ex. 16 |
|---|---|---|---|---|---|
| Filling Ratio of Temporary Thread [% in area] | 75 | 75 | 75 | 75 | 75 |
| Number of Twists [T/m] | 500 | 1000 | 1500 | 2000 | 2500 |
| Twist Angle [°] | — | 20 | — | — | 25 |
| Diameter [μm] | 33 | 32 | 32 | 32 | 33 |
| Filling Ratio of CNT Twisted Thread [% in area] | 58 | 62 | 62 | 62 | 58 |
| Tensile Strength [MPa] | 700 | 750 | 700 | 600 | 400 |

Consideration

Figure 8:
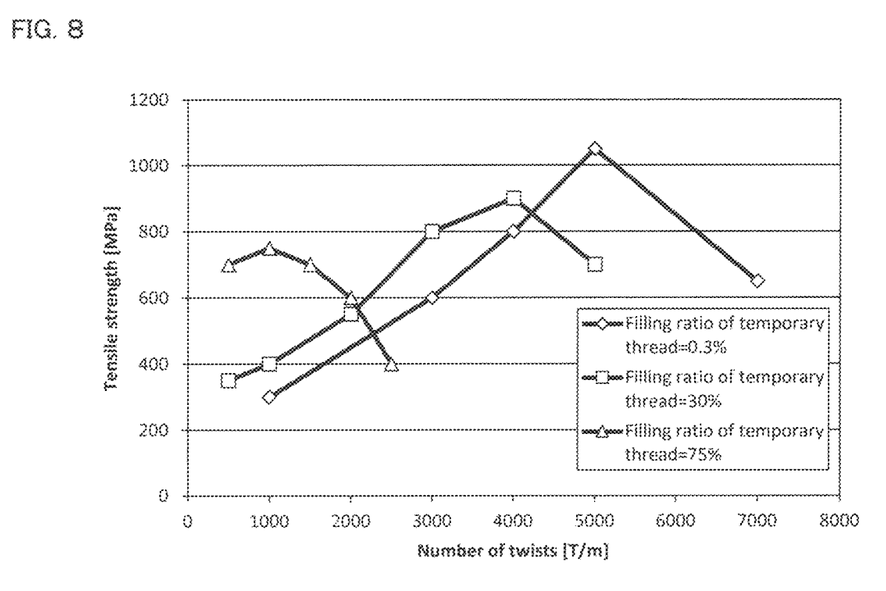
FIG. 8 shows a graph showing a correlation between number of twists of carbon nanotube twisted threads and a tensile strength of the carbon nanotube twisted threads in Examples 1 to 16.

A correlation between the number of twists of the CNT twisted thread and the tensile strength of the CNT twisted thread in Examples 1 to 16 is shown in FIG. 8. As shown in FIG. 8, it was confirmed that when the filling ratio of the temporary thread was 0.3% in area, the tensile strength of the CNT twisted thread was maximized at the number of twists of 5000 T/m (Example 4); when the filling ratio of the temporary thread was 30% in area, the tensile strength of the CNT twisted thread was maximized at the number of twists of 4000 T/m (Example 10); and when the filling ratio of the temporary thread was 75% in area, the tensile strength of the CNT twisted thread was maximized at the number of twists of 1000 T/m (Example 13). That is, it was confirmed that the number of twists at which the tensile strength of the CNT twisted thread was maximized was different, and also the maximum tensile strength of the CNT twisted thread was different, depending on filling ratio of the temporary thread.

Examples 17 to 19

For each temporary thread of Production Examples shown in Table 5, the plurality of CNT twisted threads having different number of twists of the CNT twisted thread were produced, and the maximum tensile strength of the CNT twisted thread in use of each temporary thread of Production Examples was confirmed. The results are shown in Table 5.

Comparative Example 1

As a conventional example, the CNT twisted thread was produced as follows. The CNT single threads were drawn out of the VACNTs prepared in the same manner as in Production Example 1 while rotating the substrate with the VACNTs, and the CNT single threads were wound while being twisted. The maximum tensile strength of the CNT twisted thread is shown in Table 5.

TABLE 5

| | No. | | | | | | |
|---|---|---|---|---|---|---|---|
| | Comparative Ex. 1 | Ex. 4 | Ex. 17 | Ex. 18 | Ex. 10 | Ex. 19 | Ex. 13 |
| | | | | Production Ex. | | | |
| | — | Production Ex. 1 | Production Ex. 2 | Production Ex. 3 | Production Ex. 4 | Production Ex. 5 | Production Ex. 6 |
| Filling Ratio of Temporary Yarn [% in area] | 0 | 0.3 | 3.2 | 10 | 30 | 50 | 75 |
| Maximum Tensile Strength [MPa] | 800 | 900 | 900 | 900 | 900 | 850 | 750 |

Consideration

Figure 9:
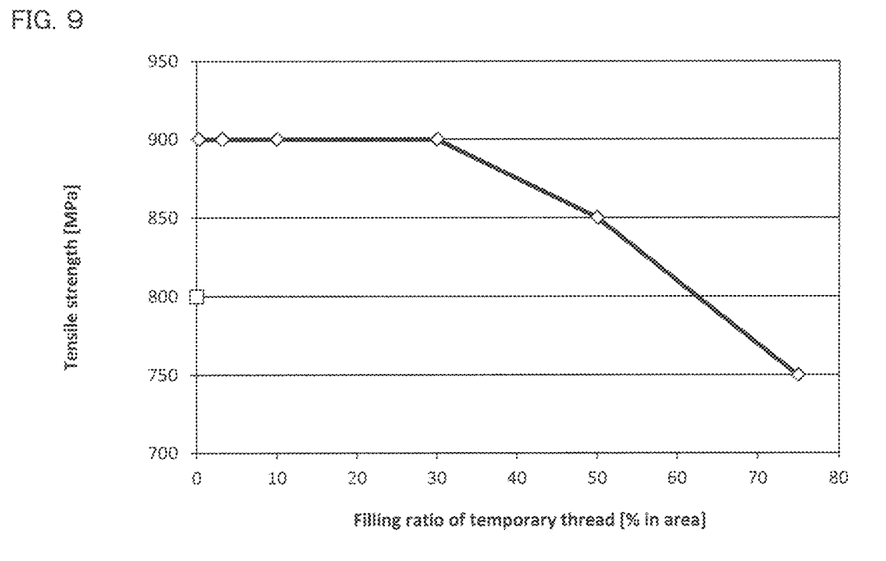
FIG. 9 shows a graph showing a correlation between a filling ratio of temporary threads and a tensile strength of carbon nanotube twisted threads in Examples 4, 10, 13, and 17 to 19, and Comparative Example 1.

In Examples 4, 10, 13, and 17 to 19 and Comparative Example 1, a correlation between the filling ratio of the temporary thread and the tensile strength of the CNT twisted thread is shown in FIG. 9. In FIG. 9, for convenience, Comparative Example 1 was described that the filling ratio of the temporary thread was 0% in area. As shown in FIG. 9, it was confirmed that when the filling ratio of the temporary thread was 30% in area or less, the relatively high tensile strength of the CNT twisted thread could be ensured, and when the filling ratio of the temporary thread was 50% in area or more, the tensile strength of the CNT twisted thread decreased.

Further, in Comparative Example, since the substrate was rotated, the webs drawn out of the VACNTs formed a triangular shape (fan shape) and were twisted in the triangular shape, whereby the angle of the triangle of the webs directly affected the twist angle, and a pitch of twists was easily spread in the length direction of the CNT twisted thread. In contrast, in Examples, since the temporary thread was twisted on a rotation axis (first winder) for twisting, it was considered that a pitch of twists of the CNT twisted thread was narrowed in the length direction, and the tensile strength increased. In the production method of Comparative Example, there was also a problem that a long CNT twisted thread could not be produced due to frequent breakage.

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

INDUSTRIAL APPLICATION

The method for producing a carbon nanotube twisted thread and the production apparatus of a carbon nanotube twisted thread of the present invention are preferably used in production of a carbon nanotube twisted thread used in various industrial products. The carbon nanotube twisted thread is preferably used in, for example, textiles (sheets) using carbon fibers, and electrically conductive wire materials for electrical devices (for example, motors, transformers, sensors, and the like).

DESCRIPTION OF REFERENCE NUMERALS

1 Substrate
2 VACNTs
10 CNT
11 Temporary thread
12 First winder
13 Die
13a Hole
14 Second winder
15 Support portion
19 CNT twisted thread
20 Temporary thread production unit
21 Twisted thread production unit
22 CNT twisted thread production apparatus

The invention claimed is:

1. A method for producing a carbon nanotube twisted thread, the method comprising:
   a step of drawing a plurality of carbon nanotubes so as to be continuous in lines out of vertically aligned carbon nanotubes disposed on a substrate and aligned vertically to the substrate, bundling the carbon nanotubes into a thread shape, and winding a temporary thread, bundled into the thread shape, around a first winder; and
   a step of feeding the temporary thread wound up from the first winder and rotating the first winder about an axis along a feeding direction of the temporary thread to twist the temporary thread,
   wherein a filling ratio of the carbon nanotube in a cross section of the temporary thread when the temporary thread is cut in a direction perpendicular to a length direction is 40% in area or less.

2. The method for producing a carbon nanotube twisted thread according to claim 1, wherein a filling ratio of the carbon nanotube in a cross section of the temporary thread is 0.3% in area or more and 40% in area or less.

3. The method for producing a carbon nanotube twisted thread according to claim 1, wherein a filling ratio of the carbon nanotube in the cross section of the carbon nanotube twisted thread when the carbon nanotube twisted thread is cut in the direction perpendicular to the length direction is larger than the filling ratio of the carbon nanotube in the cross section of the temporary thread, and is 50% in area or more and 90% in area or less.

4. The method for producing a carbon nanotube twisted thread according to claim 1, wherein a twist angle of the temporary thread is 0° or more and 10° or less.

5. The method for producing a carbon nanotube twisted thread according to claim 1, wherein a twist angle of the carbon nanotube twisted thread is 5° or more and 30° or less.

6. The method for producing a carbon nanotube twisted thread according to claim 1, wherein the plurality of carbon nanotubes drawn so as to be continuous in lines are inserted into a hole to be bundled into the thread shape.

7. The method for producing a carbon nanotube twisted thread according to claim 6, wherein an inner diameter of the hole is $\frac{1}{3000}$ or more and $\frac{1}{100}$ or less with respect to a width of a drawing position of the carbon nanotube in the vertically aligned carbon nanotubes.

8. The method for producing a carbon nanotube twisted thread according to claim 1, wherein a second winder rotates and winds the carbon nanotube twisted thread obtained by twisting the temporary thread fed from the first winder.

9. The method for producing a carbon nanotube twisted thread according to claim 1 further comprising:
   a step of extending the carbon nanotube twisted thread in the length direction.

10. A method for producing a carbon nanotube twisted thread, the method comprising:
   a step of drawing a plurality of carbon nanotubes so as to be continuous in lines out of vertically aligned carbon nanotubes disposed on a substrate and aligned vertically to the substrate, inserting the plurality of carbon nanotubes drawn so as to be continuous in lines into a hole, bundling the carbon nanotubes into a thread shape, and winding a temporary thread, bundled into the thread shape, around a first winder; and
   a step of feeding the temporary thread wound up from the first winder and rotating the first winder about an axis along a feeding direction of the temporary thread to twist the temporary thread, wherein an inner diameter of the hole is $1/3000$ or more and $1/100$ or less with respect to a width of a drawing position of the carbon nanotube in the vertically aligned carbon nanotubes.

* * * * *